DIGITAL APPARATUS AND METHOD FOR COMPUTING RECIPROCALS AND QUOTIENTS

Filed June 12, 1968

INVENTOR.
Daniel J. Mindheim
BY Flehr, Hohbach, Test, Albritton & Herbert
Attorneys

| $A_1$ | $B_1$ | $C_1$ | $D_1$ |
|---|---|---|---|
| 0 | 0 | 0 | 0 |
| 0 | 0 | 0 | 1 |
| 0 | 0 | 1 | 0 |
| 0 | 0 | 1 | 1 |
| → 0 | 1 | 0 | 0 ← |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |

INVENTOR.
Daniel J. Mindheim
BY Flehr, Hohbach, Test, Albritton & Herbert
Attorneys

United States Patent Office 3,525,039

Patented Aug. 18, 1970

3,525,039

DIGITAL APPARATUS AND METHOD FOR COMPUTING RECIPROCALS AND QUOTIENTS

Daniel J. Mindheim, San Jose, Calif., assignor to Time Systems Corporation, Mountain View, Calif., a corporation of California Filed June 12, 1968, Ser. No. 736,326
Int. Cl. G01r *23/02*
U.S. Cl. 324—78 12 Claims

ABSTRACT OF THE DISCLOSURE

Apparatus and method for digitally measuring an input quantity and computing the reciprocal of or dividing by that quantity. The quantity is stored in digital form in an input register from which it is repeatedly transferred into an accumulator until an overflow occurs in the accumulator. The number of transfers before the overflow occurs is counted into an output register, the count registered in the output register indicates the reciprocal of the input quantity. When a number corresponding to a predetermined quantity is preset into the accumulator, the output register shows the quotient of the predetermined quantity divided by the input quantity.

BACKGROUND OF THE INVENTION

In electronic counters heretofore provided, there has been a problem of a plus or minus one count error and the loss of accuracy at lower frequencies. For example, with a one second time base and an input frequency of 100 Hz., the reading could appear as 99, 100 or 101 Hz.—an error of ±1%. If the frequency is lowered to 10 Hz., the read-out would be 9, 10 or 11 Hz.—an error of ±10%. There is, therefore, a need for a new and improved counter which will retain its accuracy at lower frequencies.

SUMMARY OF THE INVENTION AND OBJECTS

The computing counter is utilized for determining the frequency of events in an input signal and is comprised of a multidigit period register which registers the period of the input signal and multidigit accumulator means. A transfer unit is provided for transferring the period which has been registered upon the period register into the accumulator means. The transfer unit is operated by a control decade unit which is under the control of the clock frequency. A frequency register is provided for ascertaining the number of times that the period which is in the period register is transferred into the accumulator to give a direct reading of the frequency of the events in the input signal measured.

In general, it is an object of the present invention to provide a computing counter and method which can be utilized for counting very low frequencies with high resolution.

Another object of the invention is to provide a computing counter and method in which r.p.m. measurements can be readily made.

Additional objects and features of the invention will appear from the following description in which the preferred embodiment is set forth in detail in conjunction with the accompanying drawings.

DESCRIPTION OF THE PREFERRED EMBODIMENTS

Figure 1:
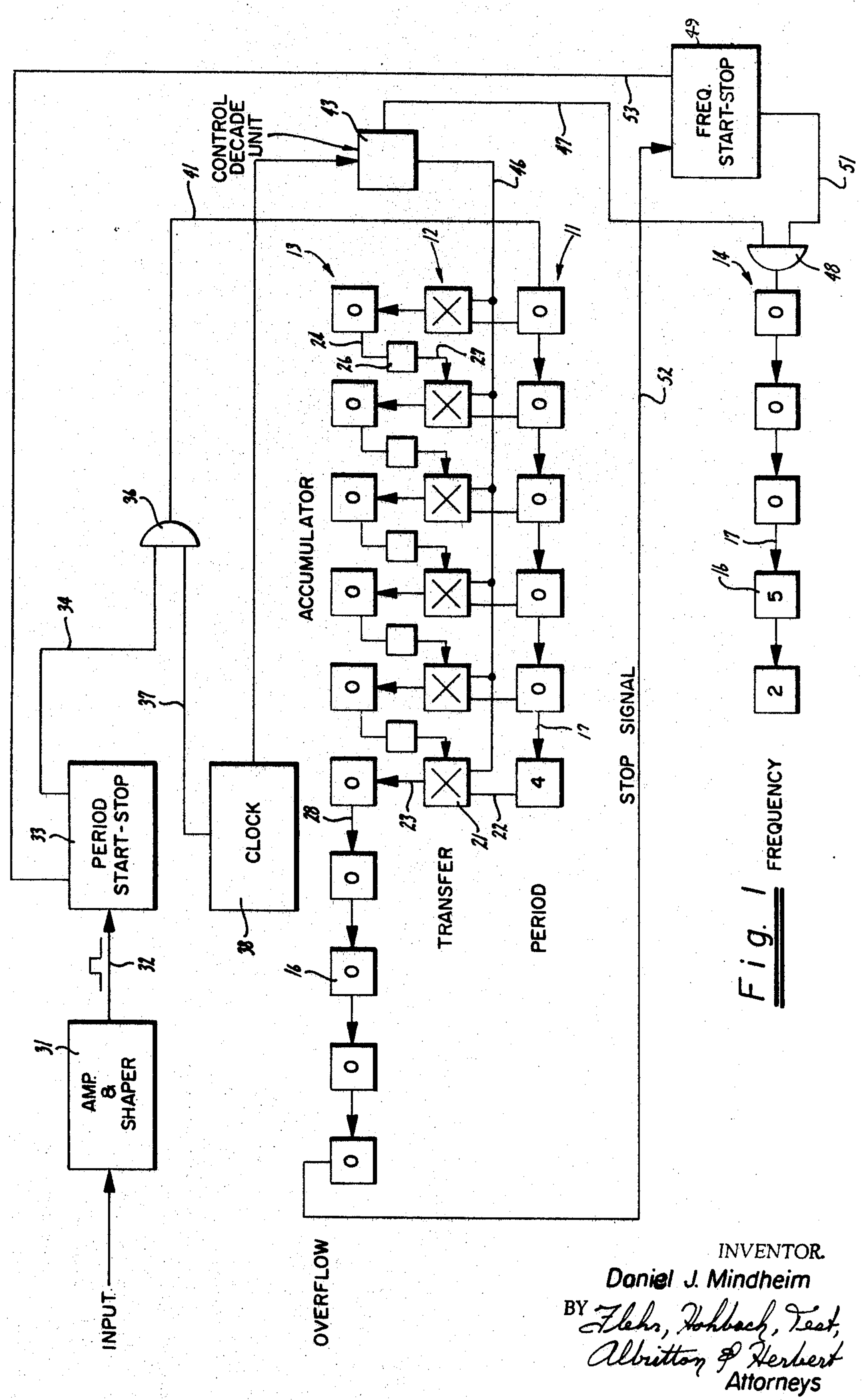
FIG. 1 is a block diagram of a computing counter incorporating the present invention.

The computing counter consists of a multidigit period register 11, a multidigit transfer unit 12, a multidigit accumulator 13 and multidigit frequency register 14. Each of the blocks 16 in the period register 11, the accumulator 13 and the frequency register 14 represents a decade counting unit (DCU). These DCU's are of a conventional type and can utilize any suitable logic such as the 8421 code. The DCU's in the period register 11 and the frequency register 14 are cascaded as shown by the arrows 17 interconnecting the blocks 16.

Both the period register 11 and the frequency register 14 are provided with six cascaded DCU's to give the capability of registering six digits. The transfer unit 12 is provided with six separate sections 21, one for each DCU of the period register, and means is provided for connecting the output of each period register to the associated transfer section as indicated by the circuit 22. The accumulator 13 is generally provided with a digit capability which is significantly greater than that of the period register and thus, for example, the accumulator 13 has a capability of registering ten digits. The first six DCU's of the accumulator have their inputs connected to the output of the six transfer sections of the transfer unit 12 by circuits 23. The first six DCU's of the accumulator 13 are not interconnected directly but have their output circuits 24 connected to a flip-flop 26 which has its output 27 connected to the transfer section associated with the succeeding DCU and the accumulator. The remaining DCU's of the accumulator 13 are connected in cascade fashion to the sixth accumulator as indicated by the arrows 28.

The input signal which is to be measured by the computing counter is supplied to a conventional amplifier and shaper 31 which supplies square waves on a circuit 32 to a period start-stop block 33. The period start-stop block supplies a signal on conductor 34 to one input of an AND gate 36. The other input of the AND gate 36 is connected by conductor 37 to a clock 38 which produces a signal having a predetermined output frequency as, for example, a frequency of 1 mHz. While the AND gate 36 is on, 1 mHz. signals are, therefore, supplied from the clock 38 through an AND gate and through conductor 41 to the input of the period register 11 which registers the period of the input signal.

At the same time the clock 38 is supplying its signal to a control decade unit 43 which is of a conventional type to cause the control decade unit to step through a BCD 842 code as hereinafter described. The output of the control decade unit is connected by a circuit 46 to each of the sections 21 of the transfer unit 12. The control decade unit 43 is of a conventional type and is provided with an overflow indicator which is supplied on circuit 47 to one input of an AND gate 48 which has its output connected to the first DCU of the frequency register 14. The other input of the AND gate 48 is connected to the output of a frequency start-stop block 49 by circuit 51. The overflow from the accumulator 13 is supplied to the frequency start-stop block by a circuit 52. The other output of the period start-stop 33 is connected to the input of the frequency start-stop by a circuit 53.

Figure 2:
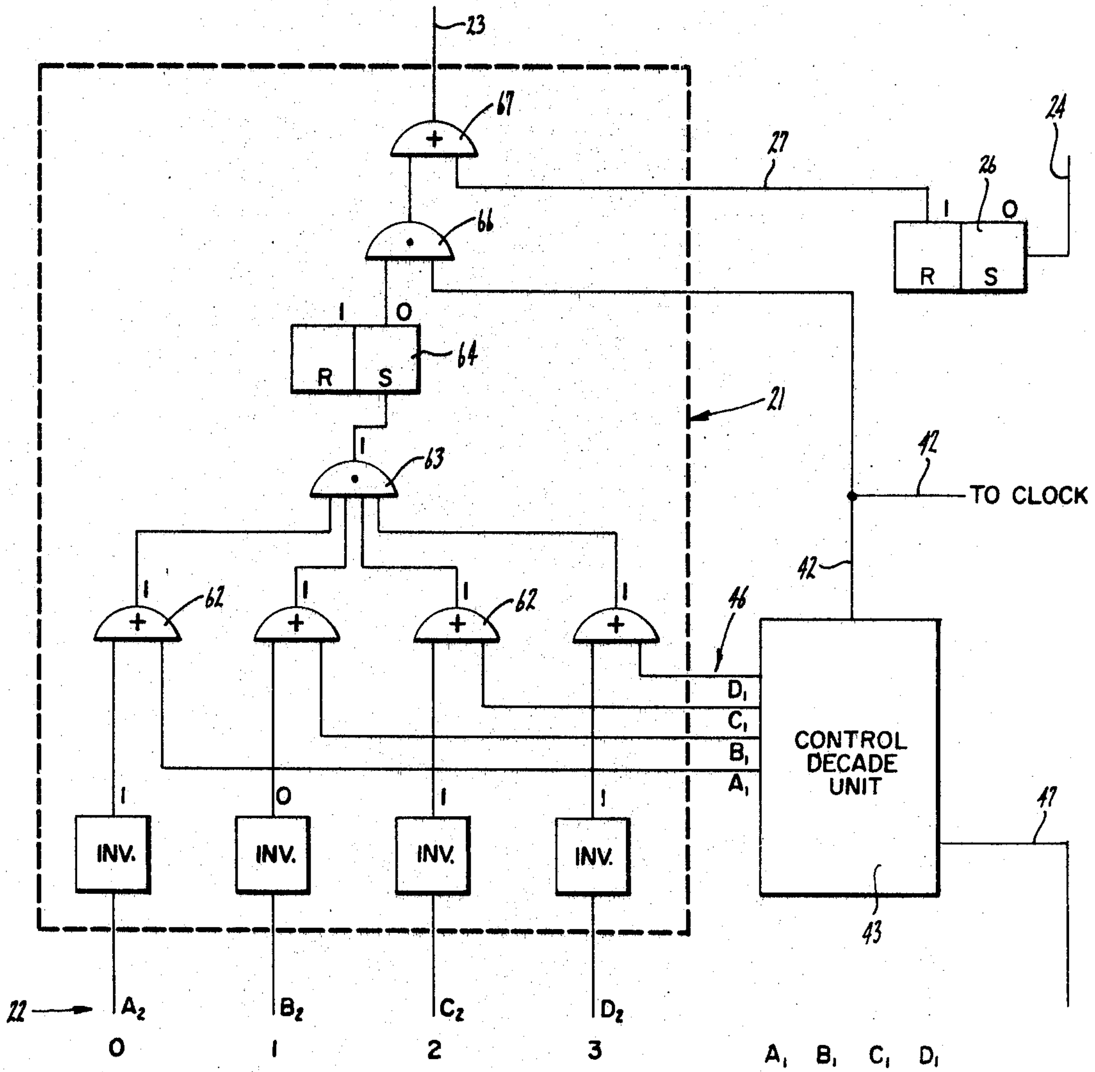
FIG. 2 is a detailed block diagram of one of the transfer units shown in FIG. 1 together with an associated logic table.

In FIG. 2, there is shown a detailed block diagram of one of the transfer sections 21 of the transfer unit 12. As shown in FIG. 2, the circuit 22 from the DCU of the period register 11 consists of four separate lines $A_2$, $B_2$, $C_2$ and $D_2$ which are connected to inverters 61 which serve to invert the signals carried on the lines $A_2$, $B_2$, $C_2$ and $D_2$. The inverters are connected to one side of four OR gates 62. The other sides of the OR gates 62 are connected to lines $A_1$, $B_1$, $C_1$ and $D_1$ of the circuit 46 from the control decade unit 43. The four outputs of the OR gates 62 are connected to the four inputs of an AND gate 63. The output of the AND gate 63 is connected to the set side of a flip-flop 64. The output of the set side of the flip-flop 64 is connected to one of the inputs of an AND gate 66. The other input of the AND gate 66 is connected to the clock 38. The AND gate 66 is connected to one input of an OR gate 67. The other input of the OR gate 67 is connected to one side of the flip-flop 26 so that when the flip-flop 26 is reset by a carry pulse from the preceding DCU of the accumulator, a 1 is applied to the OR gate 67 and to the succeeding DCU of the accumulator.

Operation of the computing counter in performing the method may now be briefly described as follows. Let it be assumed that the input signal is supplied to the amplifier and shaper 31 and that rectangular waves are provided which are supplied to the period start-stop block 33. This causes a signal to be supplied to the AND gate 36 so that clock pulses from the clock 38 are supplied on the line 41 to the period register 11. Let it also be assumed that a 1 mHz. clock is being utilized and that the period is 0.4 sec. or 400,000 microseconds. Thus, before the period start-stop block 33 removes its signal from the line 34, the period register has had the opportunity to accumulate to reach a total of 400,000 which represents the length of the period. The division process for finding the frequency of the input signal is accomplished by the transfer unit 12 which transfers the number carried by the period register into the accumulator 13 until an overflow occurs.

The exact manner in which it occurs can best be understood by examining FIG. 2. Let it be assumed that the transfer section 21 shown in FIG. 2 is the one connected to the last DCU in the period register, namely, the DCU which contains the number 4. When the number 4 is in the DCU, the four outputs $A_2$, $B_2$, $C_2$ and $D_2$ carry the numbers 0100 representing the number 4 in the BCD 8421 logic. These four numbers 0100 carried by the lines $A_2$, $B_2$, $C_2$ and $D_2$ are inverted by the inverters 61 to provide the numbers 1011 which are supplied to the OR gates 62. At the same time that this is occurring, the control decade unit 43 is stepping through the standard BCD 8421 logic shown in the table in FIG. 2 to provide in sequence 0 and 1 signals on the $A_1$, $B_1$, $C_1$ and $D_1$ lines of the circuit 46. It should be appreciated that in place of using the inverters on the lines $A_2$, $B_2$, $C_2$ and $D_2$, that inverters could be used on the lines $A_1$, $B_1$, $C_1$ and $D_1$. The control decade unit 43 is driven through the sequence by the signal received from the clock 38. The sequence is continued until the number 0100 is supplied on lines $A_1$, $B_1$, $C_1$ and $D_1$ which represents the number 4. When this occurs on the first OR gate 62, there is a 1 on the first input and 0 on the second input to provide a 1. In the second OR gate, we have a 0 on one input and a 1 on the other to provide another 1. In the third and fourth OR gates, there is a 1 on one input and a 0 on the other input to also provide 1's. Thus, the four OR gates 62 provide four 1's to the AND gate 63 which then places a 1 on its output. It is this condition only for the four OR gates 62 which will provide a 1 output of the AND gate 63.

The 1 coming out of the AND gate 63 drives the set input of the flip-flop 64. The flip-flop 64 then supplies a 0 to the AND gate 66 to disable the AND gate and prevents any further clock pulses being supplied through the AND gate 66 and to the OR gate 67 to the DCU of the accumulator to which the transfer section 21 is connected.

Thus, it can be seen that until the AND gate 66 is disabled, clock pulses from the clock 38 are supplied to the accumultor and will indicate the number which was in the DCU of the period register. In the particular example given, this will mean that the number 4 would be transferred into the accumulator.

In view of the fact that all the transfer sections are driven simultaneously, any number contained in any of the transfer sections will be transferred into the corresponding DCU's of the accumulator. In a typical counter, this sequence can be completed in 10 microseconds.

The transfer unit 21 under the control of the control decade unit 43 repeatedly transfers the number in the period register until an overflow occurs in the accumulator. Each time the control decade unit 43 goes through a sequence, an overflow signal is supplied on the circuit 47 to the AND gate 48 to the frequency register. Thus, upon the first transfer of the number in the period register into the accumulator, the number 1 is supplied to the frequency register. Thus, the first time the number in the period register is transferred in the accumulator, the number 400,000 appears in the accumulator. The next time the number 800,000 appears in the accumulator, and the third time the number 1,200,000 appears in the accumulator with the number 3 appearing in the frequency register. Immediately before overflow occurs, the number 9999600000 would appear in the accumulator and the number 24999 would appear in the frequency register. When the number 400,000 is entered once more, there will be an overflow of the most significant digit of the accumulator. This overflow supplies the signal on the line 52 to the frequency start-stop block 49 to place a 0 on the line 51 to disable the AND gate 48 to prevent any further overflow signals being received by the frequency register from the control decade unit 43. The final number appearing in the frequency register is 25,000 which is the reciprocal of the period of the input signal. Specifically, $$f=1/T$$

where $f$=the frequency, and $T$=the period of the input signal.

Actually, the foregoing equation can be written as $$f=1.000000000/T$$

With the above example, the computing counter performs the following division:

$$f=1.000000000/0.4=2.5000$$

Since the period register measures time in microseconds, the decimal point is understood and the frequency is 2.5.

It is not absolutely necessary to count the last transfer into the accumulator because that only represents an error of 1 which is acceptable in most digital work.

From the foregoing description, it can be seen that the numbers are transferred into the accumulator in parallel which is possible because the accumulator is made up of conventional DCU's.

After a measurement has been completed, another measurement can be made by wiping out the numbers carried in the registers and thereafter going through the sequence hereinbefore described.

It should be appreciated that the clock 38 can operate at any desired frequency. However, in working with the decimal system, it would be desirable to have the clock operate at a frequency which is a multiple of ten, such as 10 mHz. or 50 mHz. This frequency only controls the computing time. However, if the same clock is to be used for making a standard period measurement, it would be desirable that it either have a 1 mHz. or 10 mHz. frequency.

In order to have the frequency register give a reading which is in r.p.m., it would be necessary to divide by the number 6 or 60 to provide cycles per minute.

The transfer section herein described has the capabilities of a full decade adder with the exception that it is a serial unit rather than a parallel unit. Although the serial characteristic requires more time, the transfer section is much less expensive than a full decade adder.

It should be appreciated that although the computing counter has been described above as being used for finding the reciprocal of a number, it also can be utilized for dividing by any number simply by presetting the first number into the accumulator. For example, to divide 7,500,000,000, by 4,000,000, we are asking how many times 400,000 must be added to total the number 7,500,000,000. To accomplish this, the number 2,500,000,000 can be preset into the accumulator before the transfer process begins. Since the transfer process begins with 2,500,000,000, there are only 7,500,000,000 states remaining in the accumulator instead of the usual 10,000,000,000. The 400,000 now enters the accumulator in the usual way but an overflow occurs after a total of 7,500,000,000 has been added to the accumulator. This frequency register will read the quotient of 7,500,000,000 divided by 400,000.

It is apparent from the foregoing that there has been provided a new and improved computing counter and method which has many advantages particularly in determining the frequency of low frequency signals with a very small error. The low frequencies can be accurately measured and displayed within a very short time. Digital techniques are used throughout to make it possible to use relatively inexpensive decimal counting units.

In addition to the applications mentioned above, there are many other applications for the computing counter. For example, it can be utilized for testing crystal oscillators beating against a standard. It also is useful in Doppler radar systems. In the r.p.m. mode, the computing counter can be utilized for measuring the velocity of a rotating shaft. It also can be utilized for measuring and displaying a person's pulse rate. Other areas are gyroscope testing, flow metering, checking tachometers and making vibration tests.

What is claimed is:

1. In a computing counter for determining the frequency of the events in an input signal, a period register for registering by number the period of the input signal, an accumulator, means for transferring the number into the accumulator, with the digits of the number being transferred in parallel, until an overflow occurs in the accumulator, and frequency register means for recording the number of transfers of the number in the period register into the accumulator before the overflow occurs.

2. A counter as in claim 1 wherein said period register, said accumulator and said frequency register are all formed of decimal counting units.

3. A counter as in claim 2 wherein said means for transferring the number in the period register into the accumulator consists of a transfer unit, a control decade unit connected to the transfer unit, and means for cycling the control decade unit to cause the transfer unit to repeatedly place the number in the period register in the accumulator.

4. A counter as in claim 1 together with means for receiving the overflow signal from the accumulator for preventing the frequency register from receiving any further counts.

5. A counter as in claim 3 wherein said transfer unit is comprised of a plurality of transfer sections with a transfer section being provided for each decimal counting unit (DCU) of the period register and wherein each transfer section includes four separate gates having one input of the same connected to the DCU of the period register with which it is associated and having the other input of the gate connected to the control decade unit, and an AND gate connected to the output of the four gates to provide a signal when a signal is present on all four inputs to the AND gate.

6. A counter as in claim 3 wherein said means for controlling the cycling of said control decade unit is a clock having a predetermined frequency, together with means connecting said clock to the period register, said means connecting the clock to the period register including gate means under the control of the input signal.

7. In a method for determining the frequency of an input signal, storing the period of the input signal, repeatedly transferring the period of the input signal into an accumulator until an overflow occurs in the accumulator, and ascertaining the number of times that the period has been transferred into the accumulator to give the frequency of the signal.

8. A method as in claim 7 together with the additional step of presetting a number corresponding to a predetermined quantity into the accumulator, whereby the number of transfers ascertained is equal to the quotient of the predetermined quantity divided by the input signal.

9. In apparatus for dividing a predetermined quantity by a digital input signal which carries information in numerical form, an input register for digitally registering the information carried by the input signal, an accumulator, means for digitally transferring the numerical information from said input register into said accumulator until a value corresponding to said predetermined quantity is reached in said accumulator, the digits of said quantity being transferred to the accumulator in parallel, and output register means for recording the number of transfers before said value is reached, the number of transfers being equal to the quotient of the predetermined quantity divided by the numerical value of the input signal.

10. Apparatus as in claim 9 wherein said input register and said accumulator are formed of decimal counting units, and wherein said means for digitally transferring the quantity from said input register into said accumulator comprises a transfer unit, a control decade unit connected to the transfer unit, and means for cycling the control decade unit to cause the transfer unit to repeatedly place the number in the input register in the accumulator.

11. Apparatus as in claim 10 wherein said transfer unit is comprised of a plurality of transfer sections with a transfer section being provided for each decimal counting unit of the period register and wherein each transfer section includes four separate gates having one input of the same connected to the decimal counting unit of the period register with which it is associated and having the other input of the gate connected to the control decade unit, and an AND gate connected to the output of the four gates to provide a signal when a signal is present on all four inputs to the AND gate.

12. In apparatus for computing reciprocals from a digital input signal which carries information having a numerical value, an input register capable of storing information in decimal form for registering numerical information carried by the input signal, an accumulator, means for transferring the numerical information in the input register to the accumulator in a parallel manner until the accumulator overflows, and register means for recording the number of transfers of the numerical information into the accumulator before it overflows.

References Cited

UNITED STATES PATENTS

| | | | |
|---|---|---|---|
| 2,933,249 | 4/1960 | Scuitto | 235—52 |
| 3,312,813 | 4/1967 | Vincent et al. | |

ALFRED E. SMITH, Primary Examiner

U.S. Cl. X.R.

235—150.3, 152